United States Patent [19]

Pabon-Delgado

[11] Patent Number: 5,313,709
[45] Date of Patent: May 24, 1994

[54] ATTACHMENT FOR CONVERTING A RECIPROCATING POWER TOOL INTO POWER DRIVEN HACK SAW

[75] Inventor: Justo Pabon-Delgado, Las Piedras, P.R.

[73] Assignee: Commonwealth of Puerto Rico, San Juan, P.R.

[21] Appl. No.: 70,874

[22] Filed: Jun. 3, 1993

[51] Int. Cl.$^5$ ............................................. B23D 49/16
[52] U.S. Cl. ....................................... 30/513; 30/122; 30/392; 30/500; 83/574
[58] Field of Search ................. 30/122, 392, 394, 500, 30/513; 83/750, 783, 574

[56] References Cited

U.S. PATENT DOCUMENTS

| | | | |
|---|---|---|---|
| 1,775,692 | 9/1930 | Plut | 30/394 |
| 2,206,614 | 7/1940 | O'Hern | 30/392 |
| 2,216,828 | 10/1940 | Paque | 83/756 |
| 2,457,829 | 1/1949 | Miller | 30/392 |
| 2,721,586 | 10/1955 | Hill | 30/394 |
| 2,884,027 | 4/1959 | Pulera et al. | 83/750 |
| 3,117,600 | 1/1964 | Davis | 83/574 X |
| 4,377,909 | 3/1983 | Keener | 30/372 |
| 4,876,793 | 10/1989 | Quaglia | 30/122 |
| 5,027,518 | 7/1991 | Adomatis | 30/392 |
| 5,035,059 | 7/1991 | Takahashi et al. | 30/392 |

Primary Examiner—Eugenia Jones
Assistant Examiner—Raymond D. Woods
Attorney, Agent, or Firm—Oblon, Spivak, McClelland, Maier & Neustadt

[57] ABSTRACT

A hack saw attachment for converting a power driven saber saw or other reciprocable tool to a power driven hack saw includes a plate having a hack saw frame fixed perpendicular thereto. The sole plate of a saber saw is provided with openings for releasable connectors whereby the plate of the attachment is easily connected to the saber saw sole plate. The hack saw frame carries guides at its inner and outer ends, the inner end of the blade passes through the inner guide for attachment to the saber saw arbor. The outer guide carries a second arbor for the outer end of the blade and a spring acts on the outer arbor to ensure proper tension of the hack saw blade during cutting. The hack saw frame carries a handle to facilitate manual reciprocation of the hack saw as it is also reciprocated by the saber saw drive to ensure even wear of the hack saw teeth along the length of the blade.

5 Claims, 2 Drawing Sheets

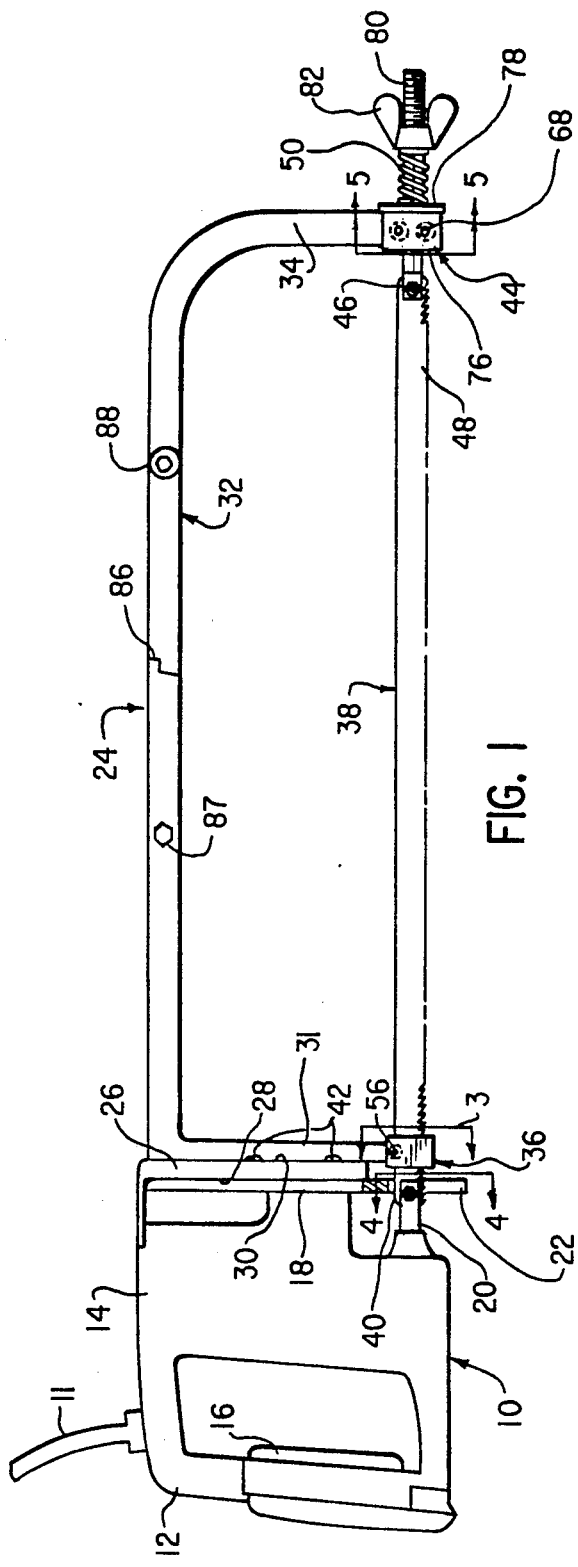
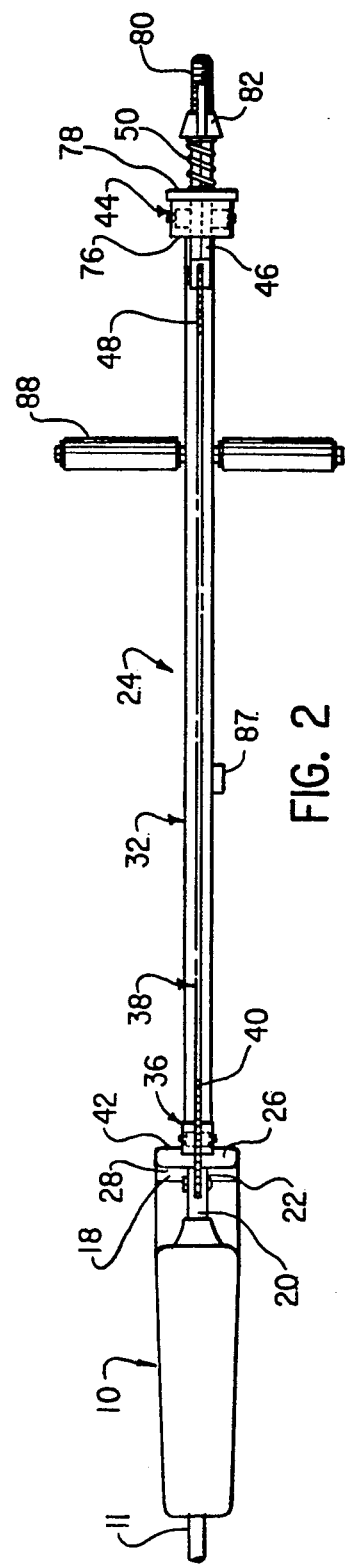

ATTACHMENT FOR CONVERTING A RECIPROCATING POWER TOOL INTO POWER DRIVEN HACK SAW

FIELD OF THE INVENTION

This invention relates to power tools and more particularly to an attachment for converting a power driven tool such as a saber saw into a power driven hack saw and vice versa.

BACKGROUND OF THE INVENTION

Though the present invention has use with any reciprocating power driven tool it will be described primarily in connection with a power driven saber saw.

Though power driven hack saws are well known such units are either complete of themselves or require elaborate mechanism for converting the rotary action of an electric drill, say, into reciprocating action necessary for operating a hack saw. Power driven saber saws are also well known and consist of a motor mounted on a sole plate having a slot at one end through which a saw blade, connected only at its inner end to a motor-driven arbor for reciprocation through the slot, cuts the material on which the sole plate is slidingly supported. So far as applicant is aware, no one heretofore has ever attempted to provide an attachment for quickly converting a conventional saber saw or similar reciprocating tool to a power driven hack saw and vice versa.

SUMMARY OF THE INVENTION

The invention comprises an attachment for releasable connection to the sole plate of a saber saw or similar reciprocating power tools and comprises a plate to one face of which is fixed a hack saw frame lying in a plane normal to that of the plate. Releasable means, such as screws or bolts, are employed for connecting the plate to the saber saw sole plate, the frame having an inner slotted guide for the inner end of a hack saw blade, the inner guide, when the attachment plate is fixed to the saber saw sole plate being in alignment with the usual slot for the saber saw blade adjacent one end of the sole plate, and with the reciprocating arbor for the saber saw. The outer end of the hack saw frame carries a second guide which is in alignment with the first guide, and reciprocally received in the second guide is a second arbor for the outer end of a hack saw blade. A spring acts on the second arbor to urge it at all times outwardly in a direction away from the inner guide. The inner end of a hack saw blade may be connected directly to the saber saw arbor, if the dimensions thereof permit, or an adaptor can be utilized having an inner end for reception in the regular saber saw arbor slot and an outer end dimensioned to receive the inner end of a hack saw blade.

BRIEF DESCRIPTION OF THE DRAWING

FIG. 1 is a side elevational view of an attachment for a hack saw blade releasably assembled to the sole plate of a tool such as the saber saw shown;

FIG. 2 is a bottom plan view of the assembly of FIG. 1;

DETAILED DESCRIPTION OF THE INVENTION

Figure 3:
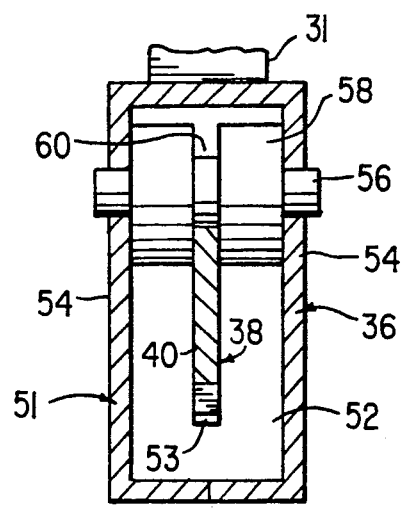
FIG. 3 is an enlarged vertical cross sectional view taken substantially on the line 3—3 of FIG. 1 of the inner guide for the inner end of a hack saw blade.

With reference now to the drawings the numeral 10 designates a conventional reciprocable power tool such as an electric saber saw assembly including an electrical cord 11, handle 12, a motor 14, a squeeze type trigger switch 16 and a sole plate 18 which is normally slideably engageable with the surface of an article being cut by a saber saw blade (not shown). The saber saw assembly further includes a power driven arbor 20 for reciprocating the saber saw blade through an open slot 22 at one end of the sole plate 18.

In accordance with the invention, the hack saw attachment, generally indicated by the numeral 24, comprises a flat plate 26 having inner and outer faces 28, 30. Centrally fixed as by welding, to the outer face 30 of the plate 26 is the inner end 31 of a hack saw frame 32 which extends away from the plate 26 perpendicularly thereto. The frame 32 has a down-turned outer end 34, and carried by the inner end 31 of the frame 32 is a slotted first guide 36, described in greater detail below, for slideably receiving a hack saw blade 38 adjacent its inner end 40. Means such as the machine screws 42 shown, releasably connect the flat plate 26 of the hack saw attachment to the sole plate 18 of the saber saw with the inner face 28 of the plate 26 in abutment with the sole plate 18 of the saber saw. The only required alteration to the saber saw would be the provision of holes in the sole plate 18 which may be tapped for the machine screws 42 or, instead of machine screws, bolts could be used which pass through the holes in the sole plate to receive nuts, which may be butterfly nuts.

The first blade guide 36 is so positioned on the inner end 31 of the hack saw frame 32 that when the flat plate 26 of the hack saw attachment is connected to the sole plate the first guide 36 aligns with the saber saw slot 22 in the saber saw sole plate 18 and the saber saw arbor 20.

A second guide 44 is carried by the down-turned outer end 34 of the hack saw frame 32 positioned to align with the first guide 36. As described in more detail below, a second arbor 46 is reciprocally slidable within the second guide 44 with means being carried by the second arbor 46 for releasably connecting thereto the outer end 48 of the hack saw blade 38. A spring 50 acts on the second arbor for resiliently urging it at all times in a direction away from the blade guide 36 at the inner end of the hack saw frame 32.

With reference now to FIG. 3, the blade guide 36 for the inner end 40 of the hack saw blade 38 may comprise a housing 51 having an open outer face, an inner wall 52 closed except for a slot 53 therethrough and a pair of laterally spaced side walls 54 in which the opposite ends of a spindle 56 are journalled. The spindle 56 supports a roller 58 having an annular recess 60 therein of a size to receive the upper edge of the inner end 40 of the hack saw blade 38. The slot 53 in the inner wall 52 of the blade guide housing is of a size to provide a clearance on all sides of the blade when its inner end is connected to the saber saw arbor 20, the roller 58 being so positioned in the housing 51, and the slot 53 having such a depth relative to that of the hack saw blade, that when the inner end 40 of the hack saw blade 38 is connected to the saber saw arbor 20, the blade is prevented from abradingly reciprocating against any fixed part of the inner guide 36.

Figure 4:
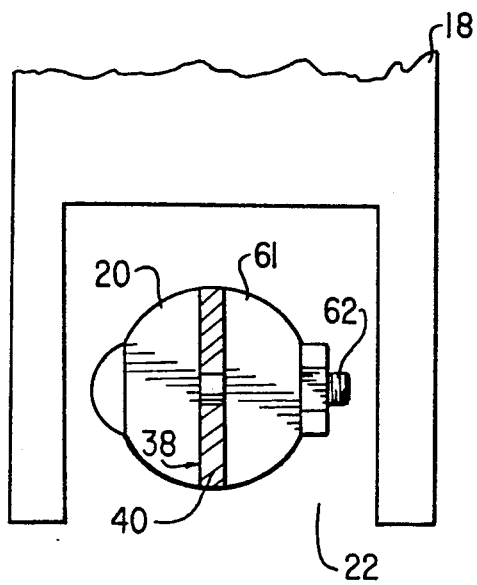
FIG. 4 is a vertical cross sectional view taken substantially on the line 4—4 of FIG. 1 of a representative reciprocal arbor for the inner end of either a saber saw or a hack saw blade.

FIG. 4 illustrates in greater detail the arbor 20 to which is normally connected one end of a saber saw blade. Instead of a saber saw blade the inner end 40 of the hack saw blade 38 is received within the bifurcated end 61 of the arbor, a bolt 62 passing through a pair of aligned openings in the legs of the bifurcated end 61 of the arbor and the usual opening at the end of a hack saw blade. Should the opening in the arbor be of a size which is too small to accept the end of a hack saw, it is within the purview of the invention to provide a separate hack saw blade arbor (not shown) having a fin at one end of the approximate size of the inner end of a saber saw blade, and a bifurcated part at the other end similar to the member 61 shown in FIG. 4 to receive the end of the hack saw blade in the same manner as shown in FIG. 4.

Figure 5:
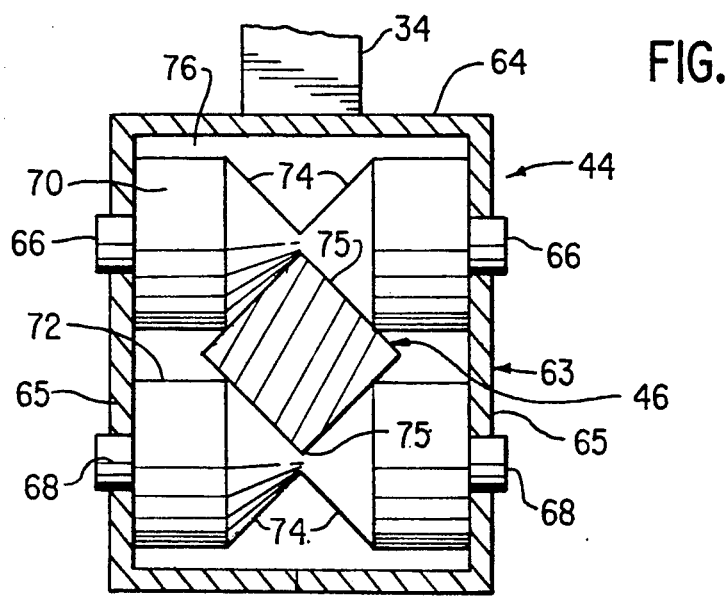
FIG. 5 is a vertical cross sectional view taken substantially, on the line 5—5 of FIG. 1 of a guide for a second reciprocable arbor for reception of the outer end of a hack saw blade.

Turning now to FIG. 5 the outer guide 44 comprises a housing 63 having an upper wall 64 rigidly fixed, as by welding, to the down-turned outer end 34 of the hack saw frame 32. The housing 63 has a pair of laterally spaced side walls 65 each having a pair of vertically spaced openings therein for rotatably receiving two pairs of oppositely extending spindles 66, 68 carrying respective rollers 70, 72 having annular recesses 74 therein which together define a polygonal shape for receiving opposed corners 75 of the second arbor 46 which is polygonal as shown and extends through complementary openings (not shown) in the front and rear walls 76, 78 (FIGS. 1 and 2) of the housing 63. The outer end 80 of the arbor 46 is threaded to receive a butterfly nut 82 which can be adjusted on the threaded outer end to adjust the degree of compression of previously mentioned spring 50 between the nut 82 and outer face 78 of guide 44 thereby adjusting the tension on hack saw blade 38.

In the use of the invention, let it be assumed, first, that the sole plate 18 of the saber saw or other tool has been predrilled to receive the releasable fasteners 42. As a first step the saber saw blade is detached and, if the dimensions so require, an adapter (not shown) of a size to accept the inner end of a hack saw blade is connected to the conventional saber saw arbor 20. The inner end 40 of a hack saw blade 38 is then inserted rearwardly into the inner guide 36 and the outer end 48 of the hack saw blade is connected to the second arbor 46. The plate 26 of the hack saw attachment is now connected by the fastening elements 42 to the sole plate 18. The user then grasps and pulls the hack saw blade 38 against the resistance of the spring 50 to move the blade until the blade at its inner end aligns with the two openings in the bifurcated end 61 of the arbor 20. He then inserts the bolt 62 and applies the nut thereto to connect the inner end of the blade to the arbor. The user now reciprocates the blade 38 manually to ensure that the outer arbor 46 does not bottom on the outer guide 44. If it does, the operator can increase the length of the hack saw frame by use of the standard slidable length adjuster found on all hack saw frames and represented by the zig-zag lines 86 and bolt 87 shown on the frame in FIG. 1. After the frame length has been adjusted to ensure that the arbor 46 does not bottom on the guide 44, the user adjusts the compression of the spring 50 to ensure that on the forward stroke of the blade, the spring maintains sufficient tension on the blade to minimize any tendency of the blade to buckle yet, when the blade is moved rearwardly the spring does not exert excessive resistance to the retractive movement of the inner arbor 20.

The stroke of a hack saw blade driven by a saber saw would usually be less than the stroke of the hack saw when it is operated solely by hand. To distribute even wear along the teeth of the hack saw blade when operated electrically, the user would be advised to bodily reciprocate the entire assembly manually along the length of the blade as it is rapidly reciprocated by the saber saw drive. A handle 88 fixed to the upper part of the frame 32 may be provided for this purpose. The manual reciprocation would be a relatively quite-slow movement sufficient to ensure that cutting action is not limited to only a relatively few of the hack saw teeth.

When the hack saw operation is completed, the operator merely disconnects the inner end 40 of the hack saw blade from the saber saw arbor 20 (or adaptor, if one is used), and disconnects the fasteners 42 to permit separation of the attachment plate 26 from the saber saw sole plate 18. Thereafter the saber saw blade is reattached to the arbor 20, the entire conversion process taking about a minute to accomplish.

Having now described the invention, what is claimed is:

1. A hack saw attachment for converting an electrically driven reciprocating tool assembly into an electrically powered hack saw, said tool assembly including a sole plate having an outer surface, and a power driven arbor for reciprocating a tool through an open slot in said sole plate, said attachment comprising a flat attachment plate having inner and outer faces, a hack saw frame having an inner end centrally fixed to said outer face of said attachment plate and extending away from said attachment plate perpendicularly thereto, said frame having a down-turned outer end, a slotted first guide carried by the inner end of said frame for slidably receiving an inner end of a hack saw blade, means for releasably connecting to said sole plate said flat attachment plate with its inner face in abutment with said sole plate, said first guide being positioned on said frame such that when said flat attachment plate is releasably connected to said sole plate, said first guide aligns with said slot in said sole plate and with said arbor, a second guide carried by said down-turned outer end of said frame in alignment with said first guide, a second arbor reciprocally slidable within said second guide, means for releasably connecting an outer end of the hack saw blade to said second arbor, and a spring acting on said second arbor resiliently urging it in a direction away from said first blade guide at the inner end of said frame.

2. The attachment of claim 1 wherein a portion of said second arbor is polygonal in cross section and a pair of rollers in said second guide, each roller having an annular recess therein which together define a polygonal shape complementary to said portion of said second arbor, said second arbor being received in said recesses, said second arbor also having an integral, threaded outer end part extending away from the downturned outer end of said hack saw frame, a nut threaded onto said threaded end part, said spring being interposed between an outer end of said second guide and said nut.

3. The attachment of claim 1 including a handle on said hack saw frame for facilitating manual reciprocation of said attachment when connected to said tool assembly to ensure substantially even distribution of wear of the teeth of said hack saw blade as it is being reciprocated by said tool assembly.

4. The attachment of claim 1 wherein said first guide has a slot for the hack saw blade defining a clearance around said blade, a roller mounted in said first guide having an annular recess therein for receiving the edge of the hack saw blade opposite the teeth thereof.

5. The attachment of claim 1 wherein the electrically driven tool assembly comprises a saber saw.

* * * * *